Oct. 26, 1948.  E. P. LARSH  2,452,247

PISTON ROD CONNECTING DEVICE

Filed Jan. 24, 1946

INVENTOR.
EVERETT P. LARSH
BY
ATTORNEY

Patented Oct. 26, 1948

2,452,247

UNITED STATES PATENT OFFICE 2,452,247

PISTON ROD CONNECTING DEVICE

Everett P. Larsh, Dayton, Ohio

Application January 24, 1946, Serial No. 643,046

3 Claims. (Cl. 309—20)

This invention relates to a device for connecting a piston rod with a piston.

In piston rod connections of the ordinary wrist pin type the skirt of the piston is provided with bosses in which the bearings for the wrist pin are formed. This results in a non-symmetrical structure in which the axial stresses, as well as radial expansion, are unequally distributed and is unfavorable to the most satisfactory operation.

One object of the invention is to provide a piston rod connection which permits the use of a symmetrical piston casting and symmetrical machining.

A further object of the invention is to provide such a device in which the stresses are distributed substantially uniformly.

A further object of the invention is to provide such a device in which the heat is uniformly distributed throughout the surface of the piston and to the cylinder walls, thus improving heat dissipation.

A further object of the invention is to provide such a device having relatively large bearing surfaces.

A further object of the invention is to provide such a device in which the bearing surfaces are movable about a plurality of axes.

A further object of the invention is to provide such a device in which the piston is free to rotate with relation to the piston rod and thus accommodate itself to the cylinder walls.

A further object of the invention is to provide such a connection having a ball type bearing.

Other objects of the invention may appear as the device is described in detail.

Figure 3:
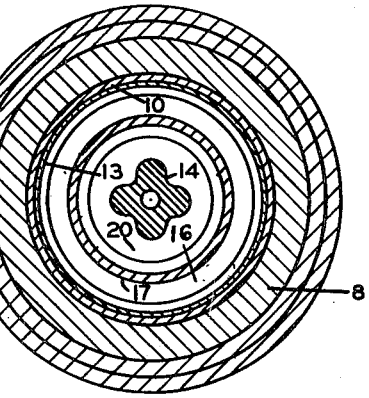
Figure 1:
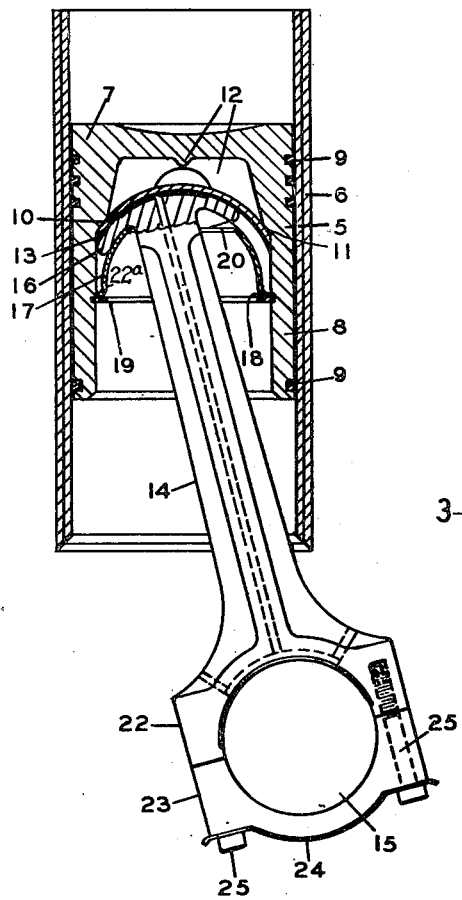
Figure 2:
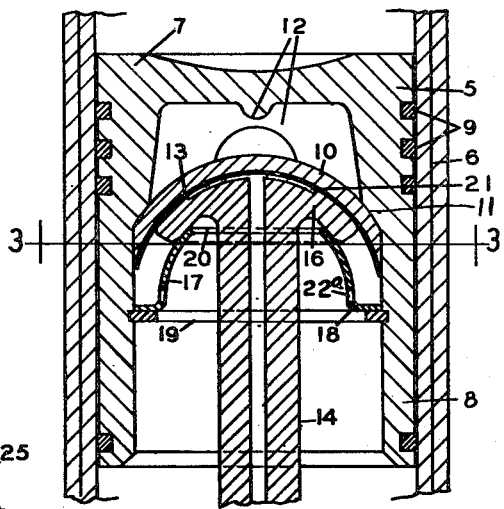

In the accompanying drawing Fig. 1 is a vertical section taken through a piston rod connection embodying the invention; Fig. 2 is a sectional view, on a larger scale, of the piston and the connecting device; and Fig. 3 is a transverse section taken on the line 3—3 of Fig. 2.

In these dawings I have illustrated one embodiment of the invention and have shown the same of a construction designed primarily for use with a two-cycle Diesel engine, but it is to be understood that the device as a whole, as well as the several parts thereof, may take various forms without departing from the spirit of the invention.

In carrying out my invention I provide the piston and the piston rod with opposed concave and convex bearing surfaces seated one within the other and constituting a ball type bearing which has large bearing surfaces and in which the bearing surfaces are relatively movable about both longitudinal and transverse axes. In the illustrated embodiment the piston 5 is mounted in an ordinary cylinder, shown conventionally at 6. The piston includes the usual head 7 and skirt 8 and is provided with piston rings 9. Mounted in the piston is a bearing member 10 having a bearing surface facing the open or lower end of the skirt and conforming to a section of a sphere. Preferably the bearing member is concavo-convex in form and is of a diameter approximating the inside diameter of the skirt of the piston. The bearing member is held rigidly against movement toward the piston head and in the present instance the skirt is provided with an inwardly extending annular shoulder 11 with which the peripheral portion of the convex surface of the connecting member contacts. The piston is also provided between the bearing member 10 and the head of the piston with a plurality of transverse ribs 12 against which the convex surface of the bearing member bears. The lower edges of the ribs and of the shoulder 11 are shaped to conform substantially to the contour of the bearing member and to thus strongly reinforce the same. The bearing member 10 is preferably provided with a nonferrous lining which constitutes the bearing surface therefor. In the present arrangement this lining comprises a concavo-convex member 13, preferably of bronze, which conforms to the concave surface of the bearing member and is fixed with relation thereto, so that in effect it forms a part of the bearing member. This lining may be very thin, preferably approximately $\frac{1}{32}$ of an inch in thickness, but is shown in the drawings as of an exaggerated thickness to facilitate illustration.

The piston rod 14 is mounted on the usual crank shaft 15 and has at its upper end a convex bearing surface conforming substantially to a section of a sphere defined on the same center as the bearing surface of the bearing member, and having movable contact with said bearing surface. Preferably the piston rod is provided at its upper or inner end with a concavo-convex head 16, here shown as integral with the piston rod, and which is of a diameter substantially greater than the thickness of the piston rod but less than the diameter of the bearing member, thus permitting the head to assume different positions with relation to the bearing member as the piston rod is moved from one position to another by the rotation of the crank shaft.

A member 17 is supported on the skirt of the piston below the head 16 of the piston rod and engages the head in such a manner as to retain the bearing member 10 and the head of the piston in bearing contact at all times. As here shown the member 17 is concavo-convex in form and has its peripheral edge turned outwardly as shown at 18 and supported on a snap ring 19 which is seated in an annular recess in the inner surface of the skirt and provides a fixed support for the member 17 on the skirt. The convex surface of the member 17 conforms to the contour of the concave surface of the head of the piston rod and is provided with an opening 20 through which the piston rod extends, the opening being of sufficient size to permit the piston rod to have both oscillatory movement and rotary movement therein, and being preferably circular in form. The concave surface of the bearing member is in constant contact with the convex surface of the member 17, thus preventing outward movement of the head 16 of the piston and with relation to the piston and holding the opposed bearing surfaces of the bearing member 10 and of the head 16 against relative movement lengthwise of the cylinder. The bearing surfaces may be lubricated in any suitable manner, as by drilling the piston rod in the conventional manner and providing the bearing surface of the head 16 with grooves 21, the lubricant being returned to the crank case through openings 22a in the retaining member 17. By this method the bearing surfaces are adequately lubricated and the lubricant is cooled.

The piston rod may be connected with the crank shaft in any suitable manner and is here shown as provided with a shaft bearing comprising a part 22 fixed with relation to the piston rod and a part 23 separate from but secured to the part 22. In a two-cycle engine the piston rod is at all times subject to downward pressure, on both the compression stroke and the power stroke, and, therefore, it is not essential that the lower member 23 of the bearing be strongly connected with the member 22. In the present instance a supporting strap 24 extends across the outer surface of the lower bearing member 23 and is secured to the upper member by pins 25, or screws, extending through the strap and the bearing member 23 and into the bearing member 22.

It will be apparent from the foregoing description that I have provided a piston rod connection having relatively large bearing surfaces which bearing surfaces are relatively movable about an axis extending lengthwise of the piston rod and about axes transverse to the piston rod, thus uniformly distributing the stresses to which the connection is subjected and permitting the piston to rotate with relation to the piston rod. The piston is of symmetrical form, which enables it to be easily cast and machined, and the bearing member and the head of the piston rod are of symmetrical construction which facilitates the forming and finishing thereof. Further the device is simple in construction and of a strong durable character and can be produced at a relatively low cost.

While I have shown and described one embodiment of my invention I wish it to be understood that I do not desire to be limited to the details thereof as various modifications may occur to a person skilled in the art.

Having now fully described my invention, what I claim as new and desire to secure by Letters-Patent, is:

1. In combination with a piston having a head and a skirt, said piston having adjacent said head an inclined annular shoulder, a bearing member separate from said piston, having a convex surface movably engaging said shoulder and having a concave bearing surface facing the open end of said skirt and conforming substantially to a section of a sphere, a piston rod having a head provided with a bearing surface conforming to and in movable supporting contact with the concave bearing surface of said bearing member, a retaining member engaging said piston rod head and having at that end thereof which is remote from said piston rod head a part adjacent the inner surface of said skirt, said skirt having a circumferential recess, and a split ring of resilient material adapted to be sprung about said piston rod and removably mounted in said recess in supporting engagement with said part of said retaining member, said split ring removably supporting said retaining member, said piston rod head and said bearing member in operative relation one to the other with said bearing member in engagement with said shoulder.

2. In combination with a piston having a head and a skirt, said piston having adjacent said head a cavity of less diameter than said skirt and forming an inclined annular shoulder spaced from said head, a concavo-convex bearing member separate from and removably supported in said piston with the marginal portion of its convex surface in movable contact with said shoulder and having a bearing surface on the concave side thereof facing the open end of said skirt, a piston rod having a head provided with a convex bearing surface in movable contact with said bearing surface of said bearing member, and having a concave bearing surface facing the open end of said skirt, a retaining member comprising a thin wall shell having an upper exterior bearing surface engaging the concave bearing surface of said piston rod head and having at its lower edge an outwardly extending flange, said skirt having a recess below said flange, and a supporting element rigidly and removably mounted in said recess in supporting engagement with said flange of said retaining member and constituting the sole means of supporting said retaining member in engagement with said piston rod head and thereby retaining the latter in engagement with said bearing member and retaining said bearing member in engagement with said shoulder.

3. In combination with a piston having a head and a skirt, said piston having adjacent said head a cavity of less diameter than said skirt and forming an inclined annular shoulder spaced from said head, a concavo-convex bearing member separate from and removably supported in said piston with the marginal portion of its convex surface in movable contact with said shoulder and having a bearing surface on the concave side thereof facing the open end of said skirt, a piston rod having a head provided with a convex bearing surface in movable contact with said bearing surface of said bearing member and also having a concave bearing surface facing the open end of said skirt, a retaining member having a bearing surface with which the concave bearing surface of said piston rod head is in movable contact, and a supporting element removably mounted on said skirt and supporting said retaining member, said piston rod head and said bearing member in operative relation one to the other, said members being removable through the open end of said skirt when said supporting element has been removed.

EVERETT P. LARSH.

REFERENCES CITED

The following references are of record in the file of this patent:

UNITED STATES PATENTS

| Number | Name | Date |
|---|---|---|
| 769,248 | Brainard | Sept. 6, 1904 |
| 878,783 | Downie | Feb. 11, 1908 |
| 1,401,075 | Hartwig | Dec. 20, 1921 |
| 1,425,567 | Wiltse | Aug. 15, 1922 |
| 1,597,706 | Aldous | Aug. 31, 1926 |
| 1,608,784 | Elsas | Nov. 30, 1926 |
| 1,788,566 | Dock | Jan. 13, 1931 |
| 1,866,057 | Reid | July 5, 1932 |
| 1,996,826 | Ohmart | Apr. 9, 1935 |
| 2,178,484 | Longley | Oct. 31, 1939 |
| 2,304,891 | Dickson | Dec. 15, 1942 |

FOREIGN PATENTS

| Number | Country | Date |
|---|---|---|
| 689,218 | France | Sept. 3, 1930 |
| 442,006 | England | Jan. 20, 1936 |